US009135885B2

(12) United States Patent
Urosev

(10) Patent No.: US 9,135,885 B2
(45) Date of Patent: Sep. 15, 2015

(54) RESOLUTION INDEPENDENT CLIENT SIDE RENDERING

(75) Inventor: Vesna Urosev, Mississauga (CA)

(73) Assignee: Adobe Systems Incorporated, San Jose, CA (US)

( * ) Notice: Subject to any disclaimer, the term of this patent is extended or adjusted under 35 U.S.C. 154(b) by 72 days.

(21) Appl. No.: 13/307,274

(22) Filed: Nov. 30, 2011

(65) Prior Publication Data

US 2014/0300643 A1     Oct. 9, 2014

(51) Int. Cl.
*G06T 11/00* (2006.01)
*G09G 5/00* (2006.01)
*G09G 5/395* (2006.01)
*G09G 5/391* (2006.01)
*G01C 21/32* (2006.01)

(52) U.S. Cl.
CPC ............... *G09G 5/00* (2013.01); *G06T 11/006* (2013.01); *G01C 21/32* (2013.01); *G09G 5/391* (2013.01); *G09G 5/395* (2013.01)

(58) Field of Classification Search
None
See application file for complete search history.

(56) References Cited

U.S. PATENT DOCUMENTS

| 6,330,003 | B1 * | 12/2001 | Curtis et al. | 345/648 |
| 7,737,980 | B2 * | 6/2010 | Le Tuan | 345/473 |
| 2008/0055273 | A1 * | 3/2008 | Forstall | 345/173 |
| 2010/0289825 | A1 * | 11/2010 | Shin et al. | 345/667 |
| 2010/0321406 | A1 * | 12/2010 | Iwase et al. | 345/638 |
| 2011/0001759 | A1 * | 1/2011 | Kim | 345/629 |
| 2012/0210232 | A1 * | 8/2012 | Wang et al. | 715/723 |
| 2012/0268465 | A1 * | 10/2012 | Inada | 345/428 |

* cited by examiner

*Primary Examiner* — Xiao Wu
*Assistant Examiner* — Steven Elbinger
(74) *Attorney, Agent, or Firm* — Kilpatrick Townsend & Stockton LLP

(57) ABSTRACT

Exemplary embodiments involve a viewer application receiving input modifying a rendering attribute of electronic content. The viewer application modifies a view-to-image transformation matrix based on the input. The view-to-image transformation matrix is capable of converting resolution-based coordinates of the electronic content to a corresponding resolution-independent coordinates of the electronic content. The viewer application generates a view-to-resolution transformation matrix based on the view-to-image transformation matrix as modified. The viewer application renders updated electronic content generated by applying the view-to-resolution transformation matrix to the electronic content.

19 Claims, 6 Drawing Sheets

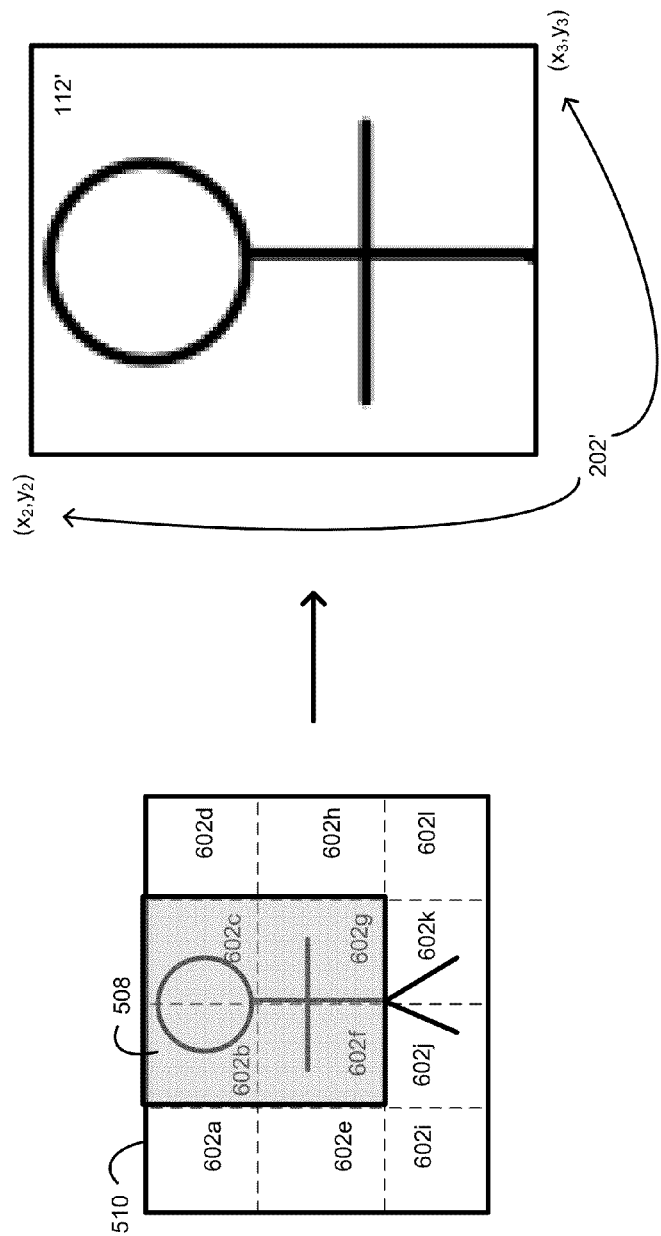

RESOLUTION INDEPENDENT CLIENT SIDE RENDERING

TECHNICAL FIELD

This disclosure relates generally to computer software and more particularly relates to modifying the display of electronic content independent of resolution.

BACKGROUND

Electronic content, such as web pages, can include any type of media that can be displayed on mobile and other computing devices. Computing devices include devices such as desktop computers, laptop computers, smart phones, tablet computers, personal digital assistants, etc. Operations changing the display of electronic content rendered at a computing device can include, for example, magnifying a portion of the electronic content via zooming or changing the horizontal or vertical position of the content on a display screen.

Viewer applications can include zooming and panning operations expressed as operations changing some attribute of the physical pixels used to display electronic content. Zooming can include, for example, a viewer application selecting a portion of an image comprised of a group of pixels and magnifying that group of pixels such that a portion of the display is occupied only by that group of pixels. Panning can include, for example, a viewer application moving an image by a certain number of pixels in a given direction. Accordingly, a viewer application manipulating a portion of an image displayed on differing display devices may require that the viewer application use different zooming and panning operations for different display devices with different screen resolutions. For example, moving content halfway across the screen on a display device with a resolution of 1000 pixels× 500 pixels may involve a lateral movement of 500 pixels, while the same movement on a display device with a resolution of 500 pixels×250 pixels may involve a lateral movement of 250 pixels.

Changing the display of electronic content based on physical pixels can therefore require modifying viewer application operations such as zooming and panning to specifically account for the resolution of the display device. Such device-specific modifications can decrease the performance of a viewer application designed for a range of computing devices. For example, a viewer application would require different operations when rendering content at a desktop computer with a monitor versus rendering content on a smart phone.

SUMMARY

Systems and methods for modifying the display of rendered content independent of the resolution of the display device are disclosed. An exemplary embodiment involves a viewer application receiving input modifying a rendering attribute of electronic content. The viewer application modifies a view-to-image transformation matrix based on the input. The view-to-image transformation matrix is capable of converting resolution-based coordinates of the electronic content to corresponding resolution-independent coordinates of the electronic content. The viewer application generates a view-to-resolution transformation matrix based on the view-to-image transformation matrix as modified. The viewer application renders updated electronic content comprising the electronic content with the rendering attribute as modified.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 6 is a conceptual diagram illustrating rendering electronic content for display on a display device.

DETAILED DESCRIPTION

Figure 1:
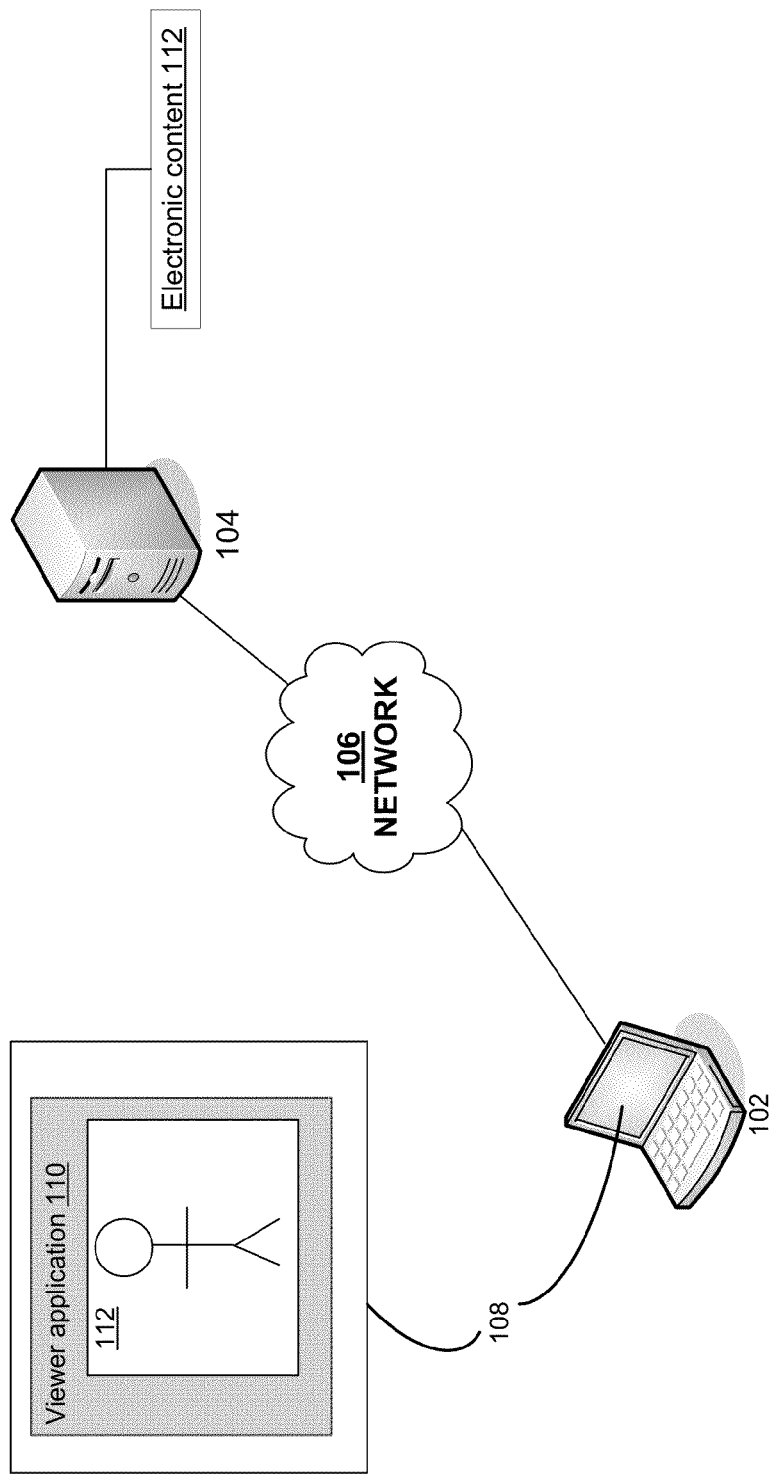
FIG. 1 is a modeling diagram illustrating electronic content displayed on an exemplary computing device.

Systems and methods for modifying the display of rendered content independent of display device resolution are disclosed. A viewer application can be used to display electronic content in different ways, e.g., with all or only particular portions of the content displayed, with varying degrees of zoom applied in displaying all or a portion of the content, etc. The portion displayed, zoom level, and other attributes of what is displayed of the electronic content by the viewer application may be modified in response to input received by the viewer application, such a user gesturing to zoom in at a particular location in the content.

One embodiment allows such an exemplary viewer application to respond to such exemplary commands in the same manner, regardless of the particular display resolution of the device upon which the viewer application is rendering the content. The exemplary viewer application modifies a resolution-independent form of the electronic content in response to a command. The exemplary viewer application subsequently applies a transform that displays an appropriate portion of the content. The transform is applied to provide the appropriate portion of the content for display on a particular device based on the resolution of the device. Applying the transform to the modified content allows the commands responding to the input modifying the content (e.g., commands responding to zoom input, scroll input, re-center input, etc.) to be independent of the particular device. Such commands of the exemplary viewer application, and other applications that can utilize the techniques disclosed herein, do not have to be programmed or otherwise customized to account for differences in the resolution of different display devices.

An exemplary embodiment involves a viewer application receiving input modifying a rendering attribute of electronic content. The viewer application modifies a view-to-image transformation matrix based on the input. The view-to-image transformation matrix is capable of converting resolution-based coordinates of the electronic content to a corresponding resolution-independent coordinates of the electronic content. The viewer application generates a view-to-resolution transformation matrix based on the view-to-image transformation matrix as modified. The viewer application renders updated electronic content comprising the electronic content with the rendering attribute as modified.

Modifying the display of electronic content independent of the resolution of the display device can provide various advantages in developing viewer applications. Expressing interactive operations in a resolution-independent process can allow viewer applications with smaller code bases. Among other things, this may improve both rendering and/or downloading performance. Furthermore, expressing interactive operations in a resolution-independent process can provide greater flexibility in the development and use of viewer applications, since new operations can be included independently of the resolution of the display device for which the viewer application renders electronic content.

As used herein, the term "viewer application" is used to refer to any application that receives and executes or interprets electronic content items and provides display data for displaying the electronic content of such items at a computing device. Examples of a viewer application include, but are not limited to, an image viewer, an Internet browser, a rich Internet application, or a desktop application. An image viewer can be an application that can render graphical images for display. Examples of image viewers can include Microsoft® Windows® Photo Viewer, Adobe® Image Viewer, or Google® Picasa. An Internet browser can be an application for retrieving, presenting, and traversing information resources available on the World Wide Web. A rich Internet application can be a web-based application with functionality equivalent to a desktop application. Examples of such functionality include, but are not limited to, features such as context menus, keyboard shortcuts, rich text editors, etc. Examples of rich Internet applications include Adobe® Flash® applications, Microsoft® Outlook® Web Access, Google® Docs®, etc.

As used herein, the term "electronic content" is used to refer to any type of media that can be displayed on a computing device of a computing system or other electronic device. Electronic content can include text or multimedia files, such as images and video. Electronic content can also include application software that is designed to perform one or more specific tasks at a computing system.

As used herein, the term "rendering attribute" is used to refer to one or more characteristics of how electronic content is rendered for display at a computing device. Examples of rendering attributes can include, but are not limited to, the position of electronic content on a display or the magnification (or zoom) of electronic content as displayed on a display device. Modifying a rendering attribute can include changing a zoom factor of the view. Modifying a rendering attribute can also include changing a zoom factor of the view.

As used herein, the term "view-to-image transformation matrix" is used to refer to a matrix including elements for converting resolution-based coordinates of electronic content to resolution-independent coordinates of electronic content. The elements of the view-to-image transformation matrix can include operations for transforming one or more of the magnification and the position of electronic content from resolution-based coordinates to resolution-independent coordinates.

As used herein, the term "resolution-independent" refers to something that is renderable independently from a pixel grid of the display device used by a computing device performing the rendering.

As used herein, the term "resolution-based" refers to modifying the display of electronic content through operations referencing the pixel grid of the display device used by a computing device performing the rendering.

As used herein, the term "view-to-resolution transformation matrix" is used to refer to a matrix including elements for converting resolution-independent coordinates of electronic content to resolution-based coordinates for display at a given display device.

The following example illustrates how a viewer application executes resolution-independent operations modifying the display of electronic content independent of the resolution of the display device. A viewer application, such as an Internet browser, can be used to render for display electronic content, such as an image. The image can be viewed on a display device in communication with a computing device, such as a monitor for a desktop computer. The viewer application can include a module for applying a view-to-image transformation matrix to the resolution-based coordinates of the image so that the image is expressed in resolution-independent coordinates. Any operations of the viewer application modifying how the image is rendered for display can modify the resolution-independent coordinates of the image. The viewer application can also include a module for applying a view-to-resolution transformation matrix to the resolution-based coordinates of the image so that resolution-independent operations can be used to modify the display of an image at a given display device. Thus, the operations of converting between resolution-based and resolution-independent coordinates can be abstracted from operations modifying rendering attributes of the image. Accordingly, in the development of the viewer application, interactive operations such as zooming or panning the electronic content can be modified independently of the underlying display device for which the viewer application can render the electronic content.

In an exemplary embodiment, the viewer application can generate the view-to-image transformation matrix for transforming resolution-based coordinates into resolution-independent coordinates. The viewer application can generate the view-to-image transformation matrix by determining a vertical scaling element, a horizontal scaling element, a vertical translation element, and a horizontal translation element. The viewer application can determine the vertical scaling element based on a height of the electronic content as rendered for display on a display device. The viewer application can determine the horizontal scaling element of the view-to-image transformation matrix based on the vertical scaling element and an aspect ratio of the electronic content as rendered for display on the display device. The viewer application can determine the vertical translation element of the view-to-image transformation matrix based on the vertical scaling element and the height of the electronic content as rendered for display on the display device. The viewer application can determine the horizontal translation element of the view-to-image transformation matrix based on the horizontal scaling element and a width of the electronic content as rendered for display on a display device.

In an exemplary embodiment, receiving input modifying a rendering attribute and modifying a view-to-image transformation matrix based on the input can include receiving input directing the viewer application to execute a "tap-to-zoom" operation zooming inward on a clicked portion of the electronic content. Zooming inward on the clicked portion can include changing the zoom factor of the electronic content by modifying the horizontal scaling element and the vertical scaling element of the view-to-image transformation matrix. Zooming inward on the clicked portion can also include changing the vertical position and horizontal position of the electronic content by modifying the horizontal translation element and the vertical translation element of the view-to-image transformation matrix such that the center of the electronic content is aligned with a click point on the display screen of the display device receiving the input. The viewer application can convert the resolution-based coordinates of the click point into resolution-independent coordinates using the view-to-image transformation matrix. The viewer application can modify the view-to-image transformation matrix based on the resolution-independent expression of the tap-to-zoom operation.

In additional or alternative embodiments, receiving input modifying a rendering attribute and modifying a view-to-image transformation matrix based on the input can include receiving input directing the viewer application to execute a "pinch-to-zoom" operation zooming inward on a "pinched" portion of the electronic content. Zooming inward on the "pinched" portion can include changing the zoom factor of the electronic content by modifying the horizontal scaling element and the vertical scaling element of the view-to-image transformation matrix. Zooming inward on the "pinched" portion can also include changing the vertical position and horizontal position of the electronic content by modifying the horizontal translation element and the vertical translation element of the view-to-image transformation matrix such that the center of the electronic content is aligned with a center pinch point on the display screen of the display device halfway between the objects performing the pinching motion. The viewer application can convert the resolution-based coordinates of the center pinch point into resolution-independent coordinates using the view-to-image transformation matrix. The viewer application can also convert the path of the objects performing the pinching gesture from resolution-based coordinates to resolution-independent coordinates using the view-to-image transformation matrix. The viewer application can modify the view-to-image transformation matrix based on the resolution-independent expression of the pinch-to-zoom operation.

In additional or alternative embodiments, receiving input modifying a rendering attribute and modifying a view-to-image transformation matrix based on the input can include receiving input directing the viewer application to continuously zoom inward on a portion of the electronic content. Continuously zooming on electronic content can include the viewer application rendering one or more intermediate versions of the electronic content in addition to the final version of the electronic content. For example, when modifying a zoom factor for a portion of electronic content from a magnification of 100% to magnification of 200%, a viewer application 110 may render intermediate versions of the electronic content at magnifications of 125%, 150%, and 175% prior to rendering the electronic content at 200%. Continuously zooming on the portion of electronic content can include determining a desired magnification for the final version of the electronic content, dividing a zooming action into a number of intermediate steps, and determining a modification of the view-to-image transformation matrix including intermediate scaling factors and translation factors for each step during the continuous zoom.

In an exemplary embodiment, generating a view-to-resolution transformation matrix for transforming resolution-independent coordinates into resolution-based coordinates can include selecting a derivative of the electronic content based on at least one of a horizontal scaling element or a vertical scaling element of the view-to-image transformation matrix.

As used herein, the term "derivative" is used to refer to one of a plurality of duplicates of the electronic content provided by a server, where each derivative includes the electronic content with successively decreasing resolution.

Selecting a derivative of the electronic content based on at least one of a horizontal scaling element or a vertical scaling element can include multiplying the horizontal scaling element and/or the vertical scaling element by the corresponding horizontal width in pixels or vertical height in pixels of each derivative.

The viewer application can select a derivative where the product of the horizontal scaling element and/or the vertical scaling element and the corresponding horizontal width in pixels or vertical height in pixels is less than two. Selecting a derivative where the product is less than two can minimize the amount of data that a viewer application must retrieve from a server to render the electronic content with the quality desired by a user. For example, an image can be rendered without a difference in quality perceptible to a user by selecting either a derivative with a product less than two or a derivative with a product greater than two. Therefore, selecting the derivative with a product greater than two would retrieve more data than necessary to render the image with the desired quality. The viewer application can determine the view-to-image transformation matrix by scaling the vertical and horizontal elements of the view-to-image transformation matrix by the corresponding horizontal width in pixels or vertical height in pixels of the selected derivative.

In an exemplary embodiment, rendering the updated electronic content can include receiving a plurality of image tiles comprising at least a portion of the derivative of the electronic content, selecting a sub-set of the plurality of image tiles based on a plurality of resolution-based coordinates determined from the view-to-resolution transformation matrix, and rendering the sub-set of the plurality of image tiles. The image tiles can comprise at least a portion of a selected derivative of the electronic content. The viewer application can request the image tiles from a server. The viewer application can select a sub-set of the plurality of image tiles for rendering. The viewer application can select the sub-set based on a plurality of resolution-based coordinates determined from applying the view-to-resolution transformation matrix to the selected derivative of the electronic content. The viewer application can render the selected image tiles for display on the display device.

These illustrative examples are given to introduce the reader to the general subject matter discussed here and are not intended to limit the scope of the disclosed concepts. The following sections describe various additional embodiments and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a modeling diagram illustrating electronic content 112 displayed on an exemplary computing device 102. A server 104 provides electronic content 112 via a network 106 for rendering at the computing device 102. The exemplary electronic content 112 is rendered for display on a display device 108 in communication with the computing device 102 using a viewer application.

The computing device 102 can include any computing device configured to display electronic content, such as, for example, a desktop computer, a laptop computer, a tablet computer, a smart phone, etc. of the computing device 102 can be any device configured to present electronic content in a visual form. Examples of the display device 108 include, but are not limited to, a cathode ray tube (CRT) monitor, a liquid crystal display (LCD) monitor, a plasma display monitor, etc. The display device 108 can be integrated with the computing device 102, such as in a laptop computer or smart phone, or a separate device in communication with the computing device 102, such as a monitor in communication with a desktop computer.

Figure 2:
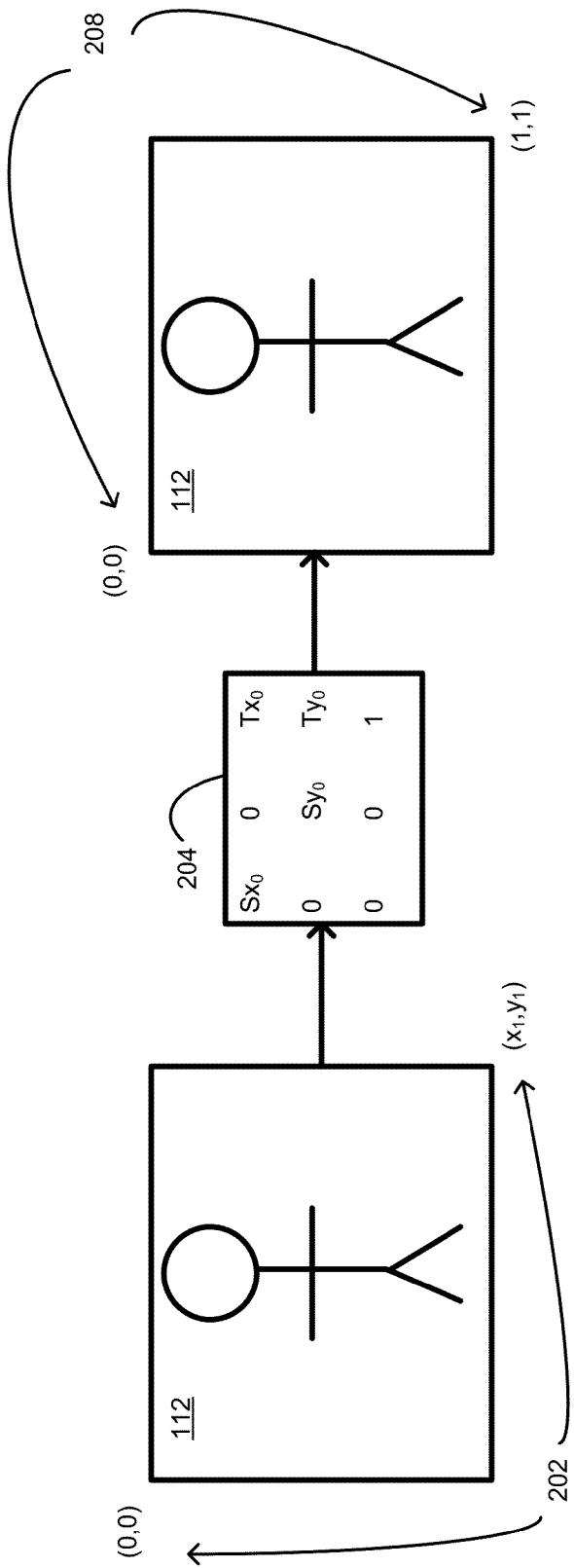
FIG. 2 is a conceptual diagram illustrating the transformation of electronic content represented using resolution-based coordinates to electronic content represented using resolution-independent coordinates.

The electronic content 112 can be represented by a series of coordinates in an x-y plane. The coordinates representing the electronic content 112 can be resolution-based coordinates corresponding to a resolution of the display device 108 or resolution-independent coordinates in a virtual space. The relationship between the resolution-based coordinates and resolution-independent coordinates can be represented via a view-to-image transformation matrix. FIG. 2 is a conceptual diagram illustrating the transformation of electronic content 112 represented using resolution-based coordinates 202 to electronic content 112 represented using resolution-independent coordinates 208.

Electronic content 112 is depicted in FIG. 2 using resolution-based coordinates 202 based on display device 108. The resolution-based coordinates 202 can identify the positions of each vertex of the electronic content 112 as rendered for display on the display device 108. The resolution-based coordinates 202 can identify a position in an x-y plane specific to a pixel grid of the display device 108. The values for coordinates x and y can include (but are not limited to) the distance in pixels from the left edge of the display device 108 and the top edge of the display device 108, respectively. For example, a display device 108 can include a screen with a width of x pixels and a height of y pixels for a resolution of x pixels×y pixels.

Any combination of the resolution-based coordinates 202 corresponding to the positions of the corners of the electronic content 112 can be used to depict the electronic content 112. For the exemplary electronic content 112 depicted in FIG. 2, the upper left vertex of electronic content 112 is positioned at the resolution-based coordinates (0, 0) and the lower right vertex of electronic content 112 is positioned at the resolution-based coordinates $(x_1, y_1)$. Although FIG. 2 depicts the upper left vertex of the electronic content 112 as positioned at the resolution-based coordinates (0, 0), the upper left vertex of the electronic content 112 can be positioned at resolution-based coordinates with non-zero values. For example, the upper left and lower right vertices of other electronic content could be positioned at resolution-based coordinates (10, 10) and (50, 50).

The electronic content 112 can also be represented using resolution-independent coordinates 208 in a virtual space. A virtual space can be a conceptual x-y plane with dimensions of 1×1. The virtual space can allow a modification of any rendering attributes of electronic content 112 to be expressed independently of the hardware characteristics, such as the rendering resolution, of the display device 108. Rendering attributes can include, but are not limited to, position, zoom, size, etc. For the exemplary electronic content 112 depicted in FIG. 2, the upper left vertex of electronic content 112 is positioned at the resolution-independent coordinates (0, 0) and the lower right vertex of electronic content 112 is positioned at the resolution-independent coordinates (1, 1).

By representing the electronic content 112 using the resolution-independent coordinates 208 in virtual space, modifications of the rendering attributes of the electronic content 112 can be expressed in terms of the resolution-independent coordinates 208, which are independent of a given display device 108, rather than the resolution-based coordinates 202, which can vary between different display devices. For example, a viewer application 110 may receive input moving electronic content 112 horizontally halfway across a display screen. On a first display device with a resolution of 1000 pixels×500 pixels, the viewer application 110 using resolution-based coordinates may move the electronic content 112 by 500 pixels in a horizontal direction on a display device. On a second display device with a resolution of 500 pixels×250 pixels, the viewer application 110 using resolution-based coordinates may move the electronic content 112 by 250 pixels in a horizontal direction on a display device. In contrast, the viewer application 110 may move the electronic content 112 by 0.5 in a horizontal direction using resolution-independent coordinates. Accordingly, in virtual space, modifying the rendering attributes of the electronic content 112 can be abstracted from the hardware specifications of the particular display device at which the electronic content is rendered.

The resolution-based coordinates 202 can be converted to the resolution-independent coordinates 208 via the view-to-image transformation matrix 204. The elements of the view-to-image transformation matrix 204 include a horizontal scaling element Sx, a vertical scaling element Sy, horizontal translation element Tx, and a vertical translation element Ty.

The horizontal scaling element Sx and the vertical scaling element Sy can represent the amount by which the resolution-based coordinates 202 must be scaled to obtain the corresponding resolution-independent coordinates. The vertical scaling element Sy can be the inverse of the height of the electronic content 112 provided by a server 104. For example, as depicted in FIG. 2, the initial vertical scaling element $Sy_0$ can be $1/y_1$. The horizontal scaling element Sx can be determined as a value that maintains the aspect ratio of the electronic content 112 when scaling the electronic content by the vertical scaling element Sy. For example, as depicted in FIG. 2, the initial horizontal scaling element $Sx_0$ can be determined based on the value of $Sy_0$. The value of initial horizontal scaling element $Sx_0$ can be determined such that the aspect ratio of the electronic content 112 is identical regardless of whether the electronic content 112 is represented using resolution-based coordinates 202 or resolution-independent coordinates 208.

The horizontal translation element Tx and vertical translation element Ty can represent a translation that aligns the center position of electronic content 112 in the resolution-based coordinates of the display device 108 with the center position of the electronic content 112 in resolution-independent coordinates of the virtual space. The initial horizontal translation element $Tx_0$ can be determined from the initial horizontal scaling element $Sx_0$ and the width $x_1$ of the display device 108, where $Tx_0 = (0.5 - Sx_0 \times x_1/2)$. The initial vertical translation element $Ty_0$ can be determined from the initial vertical scaling element $Sy_0$ and the height $y_1$ of the display device 108, where $Ty_0=(0.5-Sy_0 \times y_1/2)$.

Figure 3:
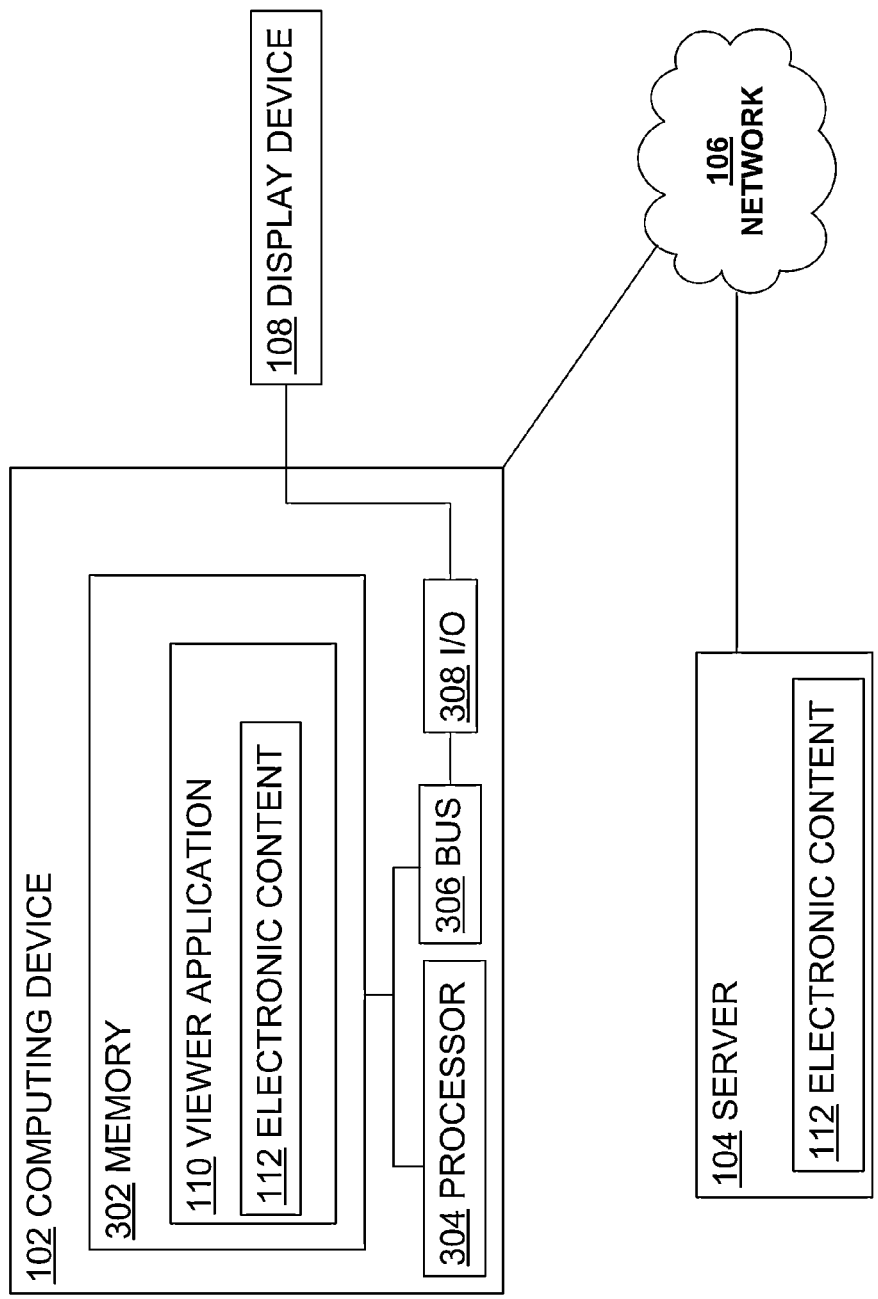
FIG. 3 is a block diagram depicting exemplary computing devices in an exemplary computing environment for implementing certain embodiments.

FIG. 3 is a block diagram depicting exemplary computing devices in an exemplary computing environment for implementing certain embodiments. Electronic content 112 executes or is otherwise used on the exemplary computing device 102 and is shown using functional components or modules. As is known to one of skill in the art, such electronic content may be resident in any suitable non-transitory computer-readable medium and can be executed on any suitable processor.

For example, as shown, an exemplary computing device 102 can include a non-transitory computer-readable medium, such as a random access memory (RAM) 302, coupled to a processor 304 that executes computer-executable program instructions and/or accesses information stored in a memory 302. Such a processor 304 may include a microprocessor, an application-specific integrated circuit (ASIC), a state machine, or other processor, and can be any of a number of computer processors. Such a processor can include, or may be in communication with, a non-transitory computer-readable medium which stores instructions that, when executed by the processor 304, cause the processor 304 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing device 102 can receive input and provide output via input/output (I/O) interface 308. Computing device 102 can provide data for display to a computing device 104 via I/O interface 308. A bus, such as bus 306, is included in the computing device 102. Computing device 102 can be any type of computing system included in a network at a domain appropriate for providing one or more of the features described herein.

FIG. 3 illustrates an exemplary computing device 102 that includes, in a memory 302, a viewer application 110 and electronic content 112. The viewer application 110 can configure the processor 304 to retrieve electronic content 112 from the server 104 via the network 106. The electronic content 112 can include, but is not limited to, video files, image files, text files, etc. The server 104 can be any source of data that provides data upon request, pushed data, or otherwise provides data items for use by other applications. The server 104 can include, but is not limited to, a dedicated server device, a cloud computing system, and/or a grid computing system. The viewer application 110 can configure the processor 304 to load the electronic content 112 into the memory 302 and render the electronic content 112 for display on the display device 108 via I/O interface 308.

Figure 4:
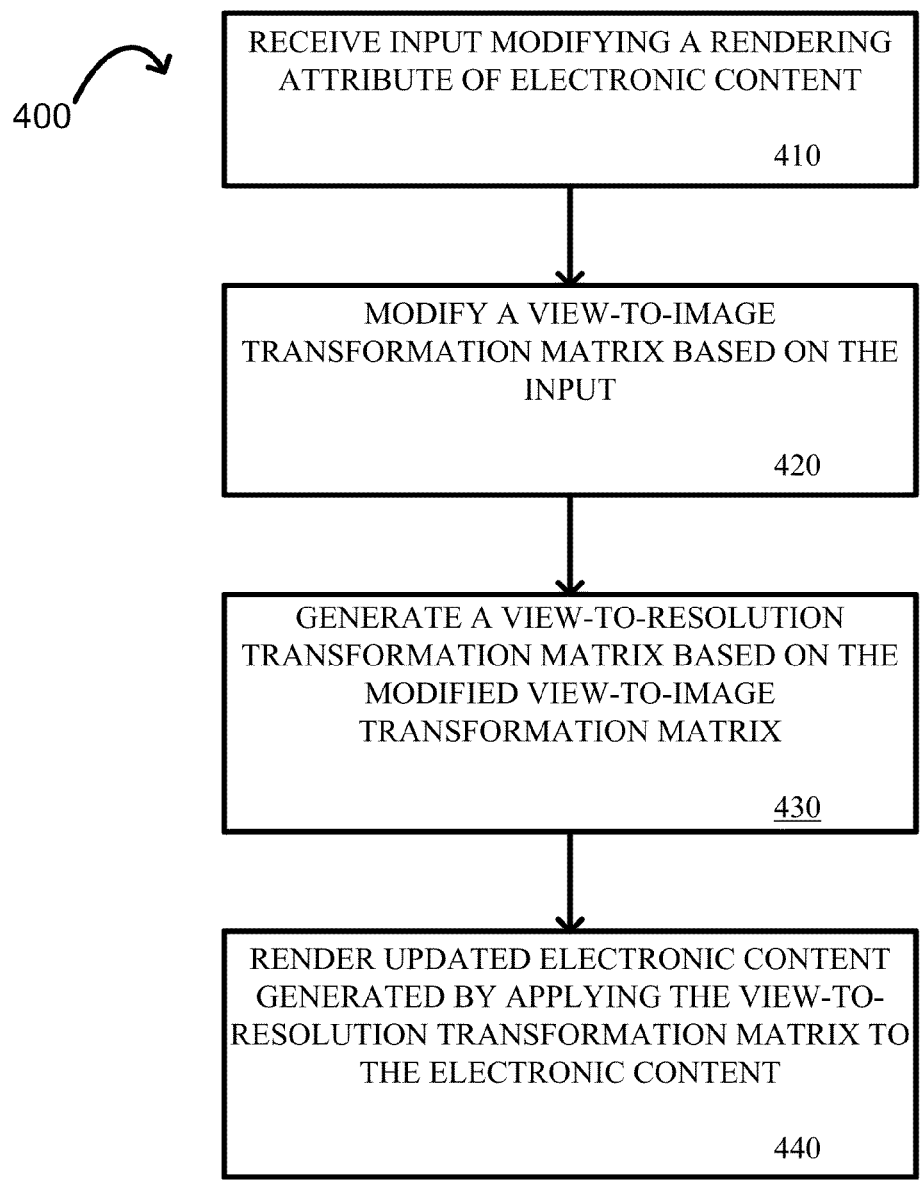
FIG. 4 is a flow chart illustrating an exemplary method for modifying a rendering attribute of electronic content 112 using resolution-independent coordinates.

FIG. 4 is a flow chart illustrating an exemplary method 400 for modifying a rendering attribute of electronic content 112 using resolution-independent coordinates. For illustrative purposes, the exemplary method 400 is described with reference to the concepts depicted in FIGS. 1 and 2 and the system implementation depicted in FIG. 3. Other implementations, however, are possible.

The exemplary method 400 involves receiving input modifying a rendering attribute of electronic content, as shown in block 410. The viewer application 110 can receive the input via I/O interface 308. The input can be received via an input device, such as a keyboard or mouse. The input can also be received from another application.

The rendering attributes of the electronic content 112 can include, but are not limited to, a zoom factor of the electronic content 112, a horizontal position of the electronic content 112, or a vertical position of the electronic content 112. The zoom factor can include a degree of magnification for the electronic content 112.

Multiple rendering attributes can be modified simultaneously. For example, a viewer application 110 may, in response to receiving two taps in rapid sequence on a region of a display, zoom in on the region of the display screen receiving the two taps. Zooming in on the region may include doubling the magnification of the region and positioning the region in the center of the display screen. Accordingly, the zoom factor of the electronic content 112 may be modified to reflect a modified magnification of twice the currently-displayed magnification and both the vertical and horizontal positions of the electronic content 112 may be modified such that the portion of the electronic content 112 receiving the taps is at the center of the screen.

The exemplary method 400 further involves modifying the view-to-image transformation matrix 204 based on the input, as shown in block 420. As discussed above with respect to FIG. 2, the view-to-image transformation matrix 204 depicted in FIG. 2 is capable of converting the resolution-based coordinates 202 of the electronic content 112 to the corresponding resolution-independent coordinates 208 of the electronic content 112.

The viewer application 110 can modify the view-to-image transformation matrix 204 to generate a modified view-to-image transformation matrix. Generating the modified view-to-image transformation matrix based on the input can include expressing the input in the form of resolution-independent coordinates. The viewer application 110 can apply the input expressed in resolution-independent form to one or more of the horizontal scaling element Sx, the vertical scaling element Sy, the horizontal translation element Tx, and the vertical translation element Ty.

In one embodiment, a viewer application 110 may receive as input a double-click from a mouse or double-tap from a touch screen directing the viewer application 110 to execute a "tap-to-zoom" operation zooming inward on the electronic content 112. Zooming in on the clicked portion can include changing the zoom factor of the electronic content by modifying the horizontal scaling element Sx and the vertical scaling element Sy and changing the vertical position and horizontal position of the electronic content 112 by modifying the horizontal translation element Tx, and the vertical translation element Ty such that the center of the electronic content 112 is aligned with the click point (x, y). The click point (x, y) can be the point on the display screen of the display device 108 receiving the double-click or double-tap. The viewer application 110 can convert the resolution-based coordinates of the click point (x, y) into resolution-independent coordinates using the view-to-image transformation matrix 204. The viewer application 110 can change the magnification of the electronic content 112 by modifying the horizontal scaling element Sx from $Sx_0$ to $Sx_1$ and the vertical scaling element Sy from $Sy_0$ to $Sy_1$. The viewer application 110 can set the value of the horizontal translation element $Tx_1$ to the difference between the value of x and one-half the width of the electronic content 112 expressed in resolution-independent coordinates. The width of the electronic content 112 expressed in resolution-independent coordinates can be determined by scaling the resolution-based width of the electronic content 112 by the horizontal scaling element $Sx_1$. The viewer application 110 can set the value of the vertical translation element $Ty_1$ to the difference between the value of y and one-half the height of the electronic content 112 expressed in resolution-independent coordinates. The height of the electronic content 112 expressed in resolution-independent coordinates can be determined by scaling the resolution-based height of the electronic content 112 by the vertical scaling element $Sy_1$.

In additional or alternative embodiments, a viewer application 110 may receive as input a pinching motion directing the viewer application 110 to execute a "pinch-to-zoom" operation zooming inward on a "pinched" portion of the electronic content 112. Zooming inward on the "pinched" portion can include changing the zoom factor of the electronic content by modifying the horizontal scaling element Sx and the vertical scaling element Sy. Zooming inward on the "pinched" portion can also include changing the vertical position and horizontal position of the electronic content 112 by modifying the horizontal translation element Tx and the vertical translation element Ty such that the center of the electronic content 112 is aligned with the center pinch point (x, y). The center pinch point (x, y) can be the point on the display screen of the display device 108 halfway between the objects performing the pinching motion. The viewer application 110 can convert the resolution-based coordinates of the center pinch point (x, y) into resolution-independent coordinates using the view-to-image transformation matrix 204. The viewer application 110 can also convert the path of the objects performing the pinching gesture (e.g., the fingers of a user) from resolution-based coordinates to resolution-independent coordinates using the view-to-image transformation matrix 204. The viewer application 110 can change the magnification of the electronic content 112 by modifying the horizontal scaling element Sx from $Sx_0$ to $Sx_1$ and the vertical scaling element Sy from $Sy_0$ to $Sy_1$. The change in magnification can correspond to the distance traveled by the objects performing the pinching motion. The viewer application 110 can set the value of the horizontal translation element $Tx_1$ to the difference between the horizontal value of the center pinch point expressed in resolution-independent coordinates before and after the view-to-image transformation. The viewer application 110 can set the value of the vertical translation element $Ty_1$ to the difference between the vertical value of the center pinch point expressed in resolution-independent coordinates before and after the view-to-image transformation. Doing so can ensure that the center of the electronic content 112 remains aligned with the centre pinch point (x, y) on the display device 108.

In additional or alternative embodiments, a viewer application 110 may receive input directing the viewer application 110 to continuously zoom inward on a portion of the electronic content 112. Continuously zooming on electronic content 110 can include the viewer application rendering one or more intermediate versions of the electronic content 110 in addition to the final version of the electronic content 110. For example, when modifying a zoom factor for a portion of electronic content 110 from a magnification of 100% to magnification of 200%, a viewer application 110 may render intermediate versions of the electronic content 110 at magnifications of 125%, 150%, and 175% prior to rendering the electronic content 110 at 200%.

Continuously zooming on the portion of electronic content 110 can include determining a desired magnification for the final version of the electronic content 110, dividing a zooming action into a number of intermediate steps, and determining a modification of the view-to-image transformation matrix 204 including intermediate scaling factors and translation factors for each step during the continuous zoom.

In an exemplary embodiment using continuous zooming, the horizontal scaling element Sx and the vertical scaling element Sy at each step can be determined by solving the equation $finalScale = startScale \times stepScale^{numberSteps}$. The startScale is the value of the horizontal scaling element Sx and the vertical scaling element Sy at the start of the scaling operation, the finalScale is the value of the horizontal scaling element Sx and the vertical scaling element Sy at the end of the scaling operation, the numberSteps is the number of intermediate steps between the startScale and the finalScale, and stepScale is the value of the horizontal scaling element Sx and the vertical scaling element Sy at any given step of the scaling operation. The horizontal translation element TY, and the vertical translation element Ty at each step can be determined by solving the equations $finalTx - startTx = Tx(1 + stepScale + stepScale^2 + \ldots + stepScale^{numberSteps-1})$ for Tx and $finalTy - startTy = Ty(1 + stepScale + stepScale^2 + \ldots + stepScale^{numberSteps-1})$ for Ty.

In additional or alternative embodiments of continuous zooming with a linear zoom, the changes in scaling factors and translation factors from step to step can be equal. In additional or alternative embodiments of continuous zooming with an acceleration of the zooming as the intermediate versions of the electronic content 110 approach the final version of the electronic content 110, the changes in scaling factors and translation factors from step to step can be modified to fit a desirable smooth function, such as a cubic or quadratic curve.

The exemplary method 400 further involves generating a view-to-resolution transformation matrix based on a modified view-to-image transformation matrix, as shown in block 430. The viewer application 110 can generate the view-to-resolution transformation matrix 504.

In an exemplary embodiment, generating a view-to-resolution transformation matrix can include scaling a modified view-to-image transformation matrix using the resolution of a derivative of the electronic content 112. The derivative of the electronic content 112 can include a series of duplicates of the electronic content 112 provided by server 104 with successively decreasing resolution. Each successive image derivative has a resolution of that is one-half the resolution of the previous image derivative. For example, a first derivative may have a resolution of 1000 pixels×500 pixels, a second derivative may have a resolution of 500 pixels×250 pixels, and a third derivative may have a resolution of 250 pixels×125 pixels.

The viewer application 110 can select a derivative of the electronic content 112 based on at least one of a horizontal scaling element or a vertical scaling element of the view-to-image transformation matrix. The viewer application 110 can select the derivative by multiplying the horizontal scaling element $Sx_1$ and vertical scaling element $Sy_1$ by the widths and heights of each of the derivatives of electronic content 112. The viewer application 110 can select the highest resolution at which either the product of horizontal scaling element $Sx_1$ and the width of the derivative or the product of vertical scaling element $Sy_1$ and the height of the derivative is less than two. Selecting a derivative where the product is less than two can minimize the amount of data that the viewer application 110 must retrieve from the server 104 to render the electronic content 112 with the quality desired by a user. For example, an image can be rendered without a difference in quality perceptible to a user by selecting either a derivative with a product less than two or a derivative with a product greater than two. Therefore, selecting the derivative with a product greater than two would retrieve more data than necessary to render the image with the desired quality.

Figure 5:
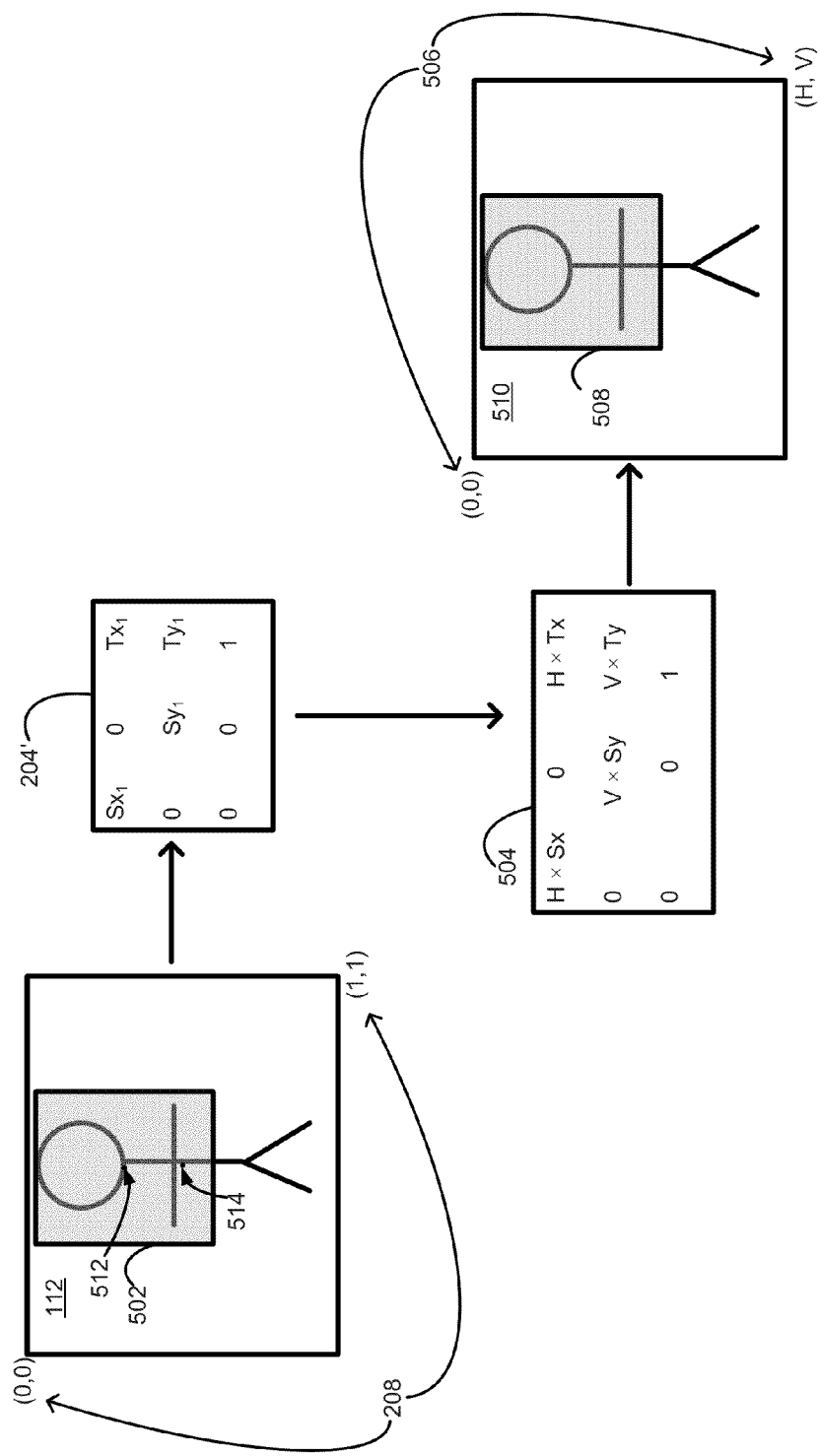
FIG. 5 is a conceptual diagram illustrating generating a view-to-resolution transformation matrix.

FIG. 5 is a conceptual diagram illustrating generating a view-to-resolution transformation matrix in block 430. In FIG. 5, the viewer application 110 receives input drawing a zoom window 502 over a portion of the electronic content 112. The zoom window 502 identifies in virtual space the portion of the electronic content 112 to be magnified. The zoom window 502 can direct the viewer application 110 to both magnify the selected portion and re-position the electronic content 112 such that the content at point 512 is moved to the center point 514. The zoom operation is represented in the virtual space by the modified view-to-image transform 204'. The desired magnification of the electronic content 112 in the virtual space can be expressed using horizontal scaling element $Sx_1$ and vertical scaling element $Sy_1$. Re-positioning the electronic content 112 in the virtual space can be expressed using the horizontal translation element $Tx_1$ and vertical translation element $Ty_1$ such that the content at point 512 is moved to the center point 514.

The view-to-resolution transformation matrix 504 can be determined by scaling the modified view-to-image transform 204' by the rendering resolution. The viewer application 110 can modify one or more elements of the modified view-to-image transformation matrix 204' based on a resolution of the derivative of the electronic content.

For example, FIG. 5 depicts the view-to-resolution transformation matrix 504 obtained using a resolution of a derivative 510 with width H and height V. Thus, in FIG. 5, the values of the horizontal scaling element $Sx_1$, the vertical scaling element $Sy_1$, the horizontal translation element $Tx_1$, and vertical translation element $Ty_1$ are scaled such that the view-to-resolution transformation matrix 504 includes horizontal scaling element $(H \times Sx_1)$, the vertical scaling element $(V \times Sy_1)$, the horizontal translation element $(H \times Tx_1)$, and vertical translation element $(V \times Ty_1)$.

The viewer application can apply the view-to-resolution transformation matrix 504 to the zooming window 502, expressed in resolution-independent coordinates, to generate a zooming window 508, expressed in resolution-based coordinates, used to identify the portion of the derivative 510 to be rendered for display on the display device 108.

The exemplary method 400 further involves rendering updated electronic content generated by applying the view-to-resolution transformation matrix 504 to the electronic content 112, as shown in block 440. The viewer application 110 can render the updated electronic content. To render the updated electronic content for display on the display device 108 after modifying the viewing attribute in virtual space, the resolution-independent coordinates as modified by the modified view-to-image transform 204' can be converted to resolution-based coordinates using a view-to-resolution transformation matrix.

An exemplary process for rendering updated electronic content 112b as described above with respect to block 440 is depicted in FIG. 6. FIG. 6 is a conceptual diagram illustrating rendering updated electronic content 112' for display on a display device 108. Rendering the updated electronic content 112' can involve the viewer application 110 requesting and receiving a plurality of image tiles 602a-1 from the server 104. The image tiles 602a-1 can comprise at least a portion of the selected derivative 510 of the electronic content 112.

The viewer application 110 can select a sub-set of the plurality of image tiles 602a-1 based on a plurality of resolution-based coordinates determined from the view-to-resolution transformation matrix. The plurality of resolution-based coordinates determined from the view-to-resolution transformation matrix can correspond to the zoom window 508. For example, the viewer application 110 can select the image tiles 602b, 602c, 602f, 602g corresponding to the portion of derivative 510 identified by the zoom window 508. The viewer application 110 can render the selected image tiles 602b, 602c, 602f, 602g for display at display device 108.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or computing devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
receiving input specifying a modification to a rendering attribute of electronic content that is rendered for display, wherein the rendered electronic content as displayed on a display device comprises a portion of the electronic content selected using a transformation matrix;
converting the modification from a resolution-specific form to a resolution-independent form of the modification using the transformation matrix;
modifying the transformation matrix to correspond to a resolution-independent form of the electronic content having the modification applied to the rendering attribute, wherein the transformation matrix is modified based on the resolution-independent form of the modification; and
updating the rendered electronic content by selecting a different portion of the electronic content using the modified transformation matrix, wherein selecting the different portion of the electronic content using the modified transformation matrix comprises selecting a version of the electronic content having a different resolution than the rendered version of the electronic content, wherein the version of the electronic content is selected based on at least one scaling element of the modified transformation matrix.

2. The method of claim 1, wherein receiving the input specifying the modification to the rendering attribute of the electronic content comprises at least one of:
receiving input changing a zoom factor of the rendered electronic content as displayed on the display device;
receiving input changing a size of a view of the rendered electronic content as displayed on the display device; and
receiving input modifying the horizontal or vertical position of the rendered electronic content as displayed on the display device.

3. The method of claim 1, wherein the input comprises a tap-to-zoom operation including a click point at which the input is received and wherein modifying the transformation matrix comprises modifying at least one translation element of the transformation matrix such that a center of the rendered electronic content after updating is at the click point.

4. The method of claim 1, wherein the input comprises a pinch-to-zoom operation including a center point between at least two objects from which the input is received and wherein modifying the transformation matrix comprises modifying at least one translation element of the transformation matrix such that a center of the rendered electronic content after updating is at the center point between the at least two objects from which the input is received.

5. The method of claim 1, wherein the input comprises a continuous zoom operation and wherein modifying the transformation matrix comprises:
identifying a first magnification for the rendered electronic content as displayed on the display device prior to receiving the input specifying the continuous zoom operation;
determining a second magnification for the rendered electronic content as displayed on the display device at the completion of the continuous zoom operation;
determining a plurality of intermediate zoom operations based on the first magnification and the second magnification, wherein each of the plurality of intermediate zoom operations implements a respective magnification between the first and second magnifications; and
generating a plurality of modified versions of the transformation matrix, wherein each of the plurality of modified versions of the transformation matrix is used to select a respective portion of the electronic content corresponding to a respective one of the plurality of intermediate zoom operations.

6. The method of claim 1, wherein selecting the version of the electronic content based on the at least one scaling element of the modified transformation matrix comprises:
calculating a value from the at least one scaling element and at least one dimension of the version of the electronic content; and
selecting the version of the electronic content based on determining that the calculated value is less than a threshold value.

7. The method of claim 6, wherein the threshold value is selected such that a selected version of the electronic content minimizes an amount of data retrieved over a network to update the rendered electronic content.

8. The method of claim 1, wherein selecting the version of the electronic content comprises:
receiving a plurality of image tiles comprising at least a portion of a derivative of the electronic content;
selecting a sub-set of the plurality of image tiles based on a plurality of resolution-based coordinates, wherein the plurality of resolution-based coordinates is determined by generating an additional transformation matrix based on the transformation matrix and a resolution of the display device; and
rendering the sub-set of the plurality of image tiles.

9. The method of claim 1, further comprising generating the transformation matrix, wherein generating the transformation matrix comprises:
determining a vertical scaling element of the transformation matrix based on a height of the electronic content as rendered for display on the display device;
determining a horizontal scaling element of the transformation matrix based on the vertical scaling element and an aspect ratio of the electronic content as rendered for display on the display device;

determining a vertical translation element of the transformation matrix based on the vertical scaling element and the height of the electronic content as rendered for display on the display device; and determining a horizontal translation element of the transformation matrix based on the horizontal scaling element and a width of the electronic content as rendered for display on the display device.

10. The method of claim 9, wherein modifying the transformation matrix comprises modifying at least one of the vertical scaling element, the horizontal scaling element, the vertical translation element, or the horizontal translation element.

11. A computing system comprising:
a processor; and
a non-transitory computer-readable medium communicatively coupled to the processor,
wherein the processor is configured for executing program code stored in the non-transitory computer-readable medium to perform operations comprising:
receiving input specifying a modification to a rendering attribute of electronic content that is rendered for display, wherein the rendered electronic content as displayed on a display device comprises a portion of the electronic content selected using a transformation matrix,
converting the modification from a resolution-specific form to a resolution-independent form of the modification using the transformation matrix,
modifying the transformation matrix to correspond to a resolution-independent form of the electronic content having the modification applied to the rendering attribute, wherein the transformation matrix is modified based on the resolution-independent form of the modification, and
updating the rendered electronic content by selecting a different portion of the electronic content using the modified transformation matrix, wherein selecting the different portion of the electronic content using the modified transformation matrix comprises selecting a version of the electronic content having a different resolution than the rendered version of the electronic content, wherein the version of the electronic content is selected based on at least one scaling element of the modified transformation matrix.

12. The system of claim 11, wherein selecting the different portion of the electronic content using the modified transformation matrix comprises selecting a version of the electronic content having a different resolution than the rendered version of the electronic content, wherein the version of the electronic content is selected based on at least one scaling element of the modified transformation matrix.

13. The system of claim 12, wherein selecting the version of the electronic content based on the at least one scaling element of the modified transformation matrix comprises:
calculating a value from the at least one scaling element and at least one dimension of the version of the electronic content; and
selecting the version of the electronic content based on determining that the calculated value is less than a threshold value, wherein the threshold value is selected such that a selected version of the electronic content minimizes an amount of data retrieved over a network to update the rendered electronic content.

14. The system of claim 11, wherein selecting the version of the electronic content comprises:

receiving a plurality of image tiles comprising at least a portion of a derivative of the electronic content;
selecting a sub-set of the plurality of image tiles based on a plurality of resolution-based coordinates, wherein the plurality of resolution-based coordinates is determined by generating an additional transformation matrix based on the transformation matrix and a resolution of the display device; and
rendering the sub-set of the plurality of image tiles.

15. The system of claim 11, wherein the operations further comprise generating the transformation matrix, wherein generating the transformation matrix comprises:
determining a vertical scaling element of the transformation matrix based on a height of the electronic content as rendered for display on the display device;
determining a horizontal scaling element of the transformation matrix based on the vertical scaling element and an aspect ratio of the electronic content as rendered for display on the display device;
determining a vertical translation element of the transformation matrix based on the vertical scaling element and the height of the electronic content as rendered for display on the display device; and
determining a horizontal translation element of the transformation matrix based on the horizontal scaling element and a width of the electronic content as rendered for display on the display device.

16. A non-transitory computer-readable medium comprising:
program code for receiving input specifying a modification to a rendering attribute of electronic content that is rendered for display, wherein the rendered electronic content as displayed on a display device comprises a portion of the electronic content selected using a transformation matrix;
program code for converting the modification from a resolution-specific form to a resolution-independent form of the modification using the transformation matrix;
program code for modifying the transformation matrix to correspond to a resolution-independent form of the electronic content having the modification applied to the rendering attribute, wherein the transformation matrix is modified based on the resolution-independent form of the modification; and
program code for updating the rendered electronic content by selecting a different portion of the electronic content using the modified transformation matrix, wherein selecting the different portion of the electronic content using the modified transformation matrix comprises selecting a version of the electronic content having a different resolution than the rendered version of the electronic content, wherein the version of the electronic content is selected based on at least one scaling element of the modified transformation matrix.

17. The non-transitory computer-readable medium of claim 16, wherein the input comprises a tap-to-zoom operation including a click point at which the input is received and wherein modifying the transformation matrix comprises modifying at least one translation element of the transformation matrix such that a center of the rendered electronic content after updating is at the click point.

18. The non-transitory computer-readable medium of claim 16, wherein the input comprises a pinch-to-zoom operation including a center point between at least two objects from which the input is received and wherein modifying the transformation matrix comprises modifying at least one translation element of the transformation matrix such that a center of the rendered electronic content after updating is at the center point between the at least two objects from which the input is received.

19. The non-transitory computer-readable medium of claim 16, wherein the input comprises a continuous zoom operation and wherein modifying the transformation matrix comprises:
- identifying a first magnification for the rendered electronic content as displayed on the display device prior to receiving the input specifying the continuous zoom operation;
- determining a second magnification for the rendered electronic content as displayed on the display device at the completion of the continuous zoom operation;
- determining a plurality of intermediate zoom operations based on the first magnification and the second magnification, wherein each of the plurality of intermediate zoom operations implements a respective magnification between the first and second magnifications; and
- generating a plurality of modified versions of the transformation matrix, wherein each of the plurality of modified versions of the transformation matrix is used to select a respective portion of the electronic content corresponding to a respective one of the plurality of intermediate zoom operations.

* * * * *